(12) United States Patent
Piliero

(10) Patent No.: US 11,716,966 B2
(45) Date of Patent: Aug. 8, 2023

(54) SECURE ENCLOSURE FOR PETS

(76) Inventor: Melina Dani Piliero, Anaheim Hills, CA (US)

( * ) Notice: Subject to any disclaimer, the term of this patent is extended or adjusted under 35 U.S.C. 154(b) by 0 days.

(21) Appl. No.: 13/065,380

(22) Filed: Mar. 21, 2011

(65) Prior Publication Data

US 2011/0226189 A1 Sep. 22, 2011

Related U.S. Application Data

(60) Provisional application No. 61/316,370, filed on Mar. 22, 2010.

(51) Int. Cl.
*A01K 1/03* (2006.01)
*A01K 1/035* (2006.01)
*E06B 7/32* (2006.01)

(52) U.S. Cl.
CPC ............... *A01K 1/035* (2013.01); *E06B 7/32* (2013.01)

(58) Field of Classification Search
CPC ...... A01K 1/035; A01K 1/0245; A01K 1/033; A01K 1/034; A01K 1/03; A01K 31/08; A01K 1/0353; E06B 7/32
USPC ........ 119/474, 482, 491, 492, 502, 513, 514
See application file for complete search history.

(56) References Cited

U.S. PATENT DOCUMENTS

| | | | | |
|---|---|---|---|---|
| 3,744,500 A * | 7/1973 | Briggs | ......................... | 135/140 |
| 4,291,645 A * | 9/1981 | Cruchelow et al. | .......... | 119/484 |
| 4,788,934 A * | 12/1988 | Fetter | ............................ | 119/484 |
| 4,989,546 A * | 2/1991 | Cannaday | ..................... | 119/484 |
| 5,165,366 A * | 11/1992 | Harvey | ........................ | 119/165 |
| 5,261,350 A * | 11/1993 | Vavrek | ........................ | 119/484 |
| 5,517,707 A * | 5/1996 | LaMantia | ......................... | 5/97 |
| 5,592,960 A * | 1/1997 | Williams | ....................... | 135/87 |
| 5,649,500 A * | 7/1997 | Klavemann et al. | ......... | 119/452 |
| 6,024,051 A * | 2/2000 | Simantob et al. | ............ | 119/431 |
| 6,029,609 A * | 2/2000 | Bahar et al. | .................. | 119/474 |
| 6,394,035 B1 * | 5/2002 | Hill | ............................... | 119/484 |
| 6,401,663 B1 * | 6/2002 | Meier, Jr. | ..................... | 119/452 |
| 6,722,315 B2 * | 4/2004 | Sinor | ........................... | 119/484 |
| 6,725,807 B1 * | 4/2004 | Tapia | .......................... | 119/496 |
| 6,745,788 B1 * | 6/2004 | Brown | ......................... | 135/117 |
| 6,912,974 B2 * | 7/2005 | Ozeri et al. | ................... | 119/484 |
| 6,944,990 B2 * | 9/2005 | Noyes | ............................. | 49/169 |
| 7,178,482 B1 * | 2/2007 | Derrick | ........................ | 119/484 |
| 7,377,231 B2 * | 5/2008 | Tsai | ............................. | 119/499 |
| 7,530,331 B1 * | 5/2009 | Malachowski | ............... | 119/484 |
| 7,640,890 B1 * | 1/2010 | Maynard | ...................... | 119/484 |
| 2007/0186866 A1 * | 8/2007 | Shibles et al. | ................ | 119/484 |

* cited by examiner

Primary Examiner — Yvonne R Abbott-Lewis
(74) Attorney, Agent, or Firm — Olav M. Underdal; IDP Patent Services

(57) ABSTRACT

A secure enclosure for pets which permits pet owners who have installed a "doggie door" to remove the threat of coyotes and other wildlife from attacking small dogs and cats.

2 Claims, 5 Drawing Sheets

100 – enclosure
102 – panel
104 – line post
106a – front barrier
106b – side barriers
108 – structure (i.e., house)
110 – doggie door
112 – cover/awning
114 – telescoping poles

FIG. 3A

300 – enclosure
302 – panel
302a – structural members (of panel)
302b – rails (of panel)
304 – line post
316 – ring members (on rails)
320 – finials (on line posts)

SECURE ENCLOSURE FOR PETS

RELATED APPLICATIONS

The present application claims priority to U.S. provisional patent application, Ser. No. 61/316,370, filed Mar. 22, 2010, included by reference herein and for which benefit of the priority date is hereby claimed.

FIELD OF THE INVENTION

The present invention relates to providing a secure enclosure for pets to egress/ingress from the house without having to be there (when used adjacent to a house having a doggie door); more particularly, to provide pets with a place to relax, while providing a safe, sturdy barrier from outside elements including non-domesticated animals such as coyotes; if used for pets to relieve themselves, keeps home odor free and results in less maintenance to flooring/carpets due to accidents; provides aesthetically pleasing design which complements and enhances the landscape of all gardens/side yards while adding comfort and security to pets; and is portable and easy to assemble/dissemble (requires no tools) and store.

BACKGROUND OF THE INVENTION

Pets, including dogs and cats, are an integral part of many family households in many different countries and cultures. According to the American Pet Products Manufacturers Association 2009-2010 National Pet Owners Survey, there are approximately 77.5 million owned dogs in the United States and approximately 93.6 million cats in the United States. Some working pet owners prefer to keep their pets indoors during the day but may be forced to keep them outside instead due to demanding work hours which do not allow them to arrive home in a timely manner to let the pet outside to relieve itself.

One solution adopted by pet owners is to install a doggie door which permits the dog (or cat) to ingress/egress from the house at will. However, the threat of coyotes and other wildlife in certain areas may make this solution unsuitable, especially for small dogs. Additionally, for pet owners who have indoor cats, this solution may be unsuitable because owner cannot control the cat from jumping over a fence and out of the yard.

The doggie door also does not provide any protection from the weather or from children who cannot be near pets because of their age or fear.

SUMMARY OF THE INVENTION

In accordance with the present invention, there is provided, a secure enclosure for pets which permits pet owners who have installed a "doggie door" to remove the threat of coyotes and other wildlife from attacking small dogs and cats.

It would be advantageous to provide a secure enclosure for pets so that pets owners and pets can peaceably enjoy the outdoors.

It would also be advantageous to provide a secure enclosure for pets so that the owner does not have to be home and the pets can access the outside without being in danger of other wildlife attacks.

It would further be advantageous to provide a secure enclosure for pets so that owners would not have to worry about pet accidents on the inside because pets have free access to patio free from wildlife attacks.

BRIEF DESCRIPTION OF THE DRAWINGS

FIG. 4 is a detailed list of the elements of FIGS. 1-3B.

DETAILED DESCRIPTION

Figure 1:
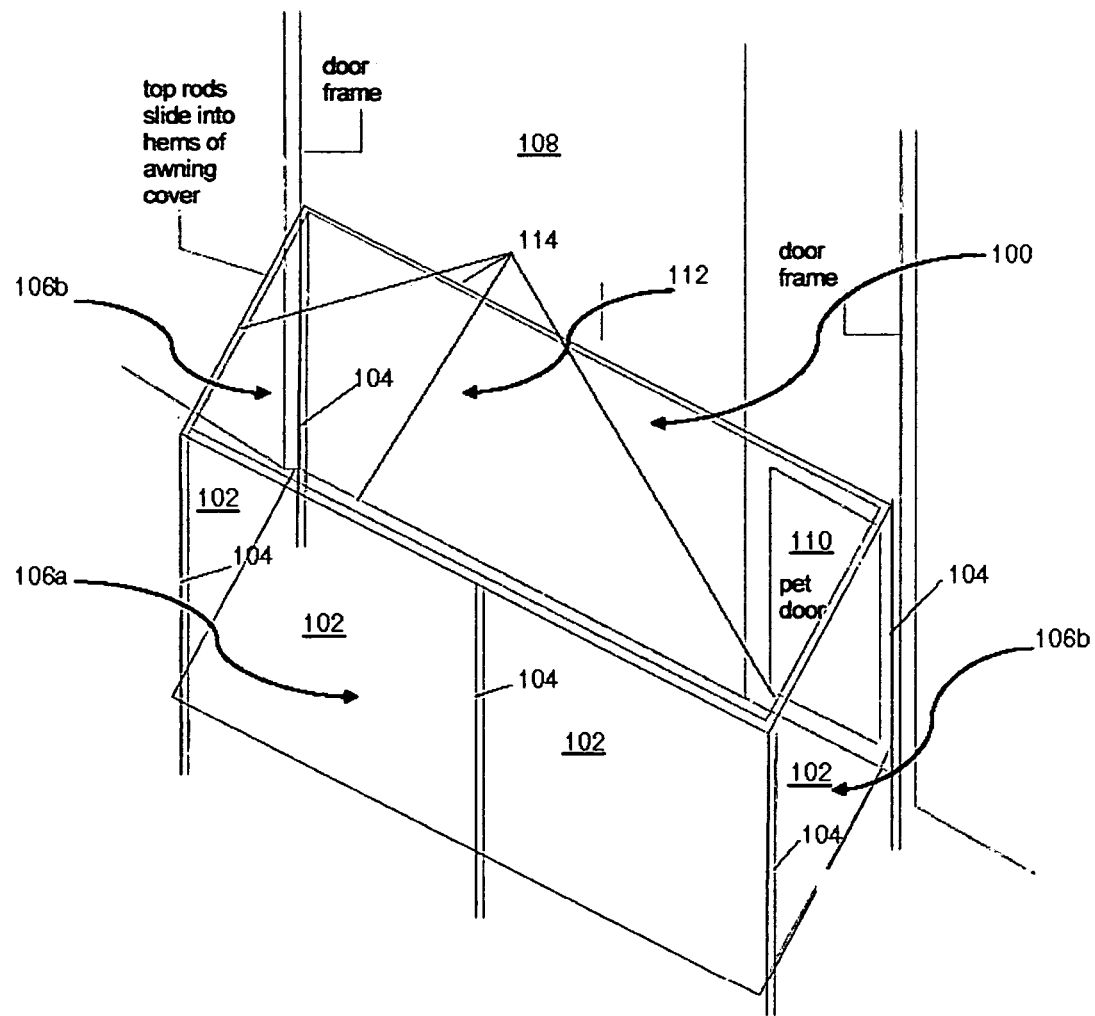
FIG. 1 depicts a top perspective view of a secure outdoor enclosure.

A complete understanding of the present invention may be obtained by reference to the accompanying drawings, when considered in conjunction with the subsequent, detailed description, in which:

Figure illustrates a secure outdoor enclosure according to an embodiment of the invention. Generally, the enclosure 100 includes a plurality of panels 102 secured together by a plurality of line posts 104. In one embodiment, one or more panels 102 define a front barrier 106 a and one or more panels 102 define side barriers 106b relative to the front barrier 106a. It should be appreciated, however, that a variety of different configurations are within the scope of the invention. When the side barriers 106b are positioned adjacent a wall of a structure 108, the enclosure 100 is defined therein. Preferably, the side barriers 106b should be positioned adjacent the wall 108 of the structure wherein the wall 108 includes ingress/egress 110 suitable for pets incorporated therein. In one embodiment, a cover 112 may cover the area defined by the enclosure 100 and may be held taut by a plurality of poles 114. The cover 112 may be an awning-type cover or any other suitable material, preferably one that is resistant to environmental conditions. In one embodiment, the cover includes a plurality of symmetrically spaced loops in which the pole 114 may thread thereto.

Figure 2:
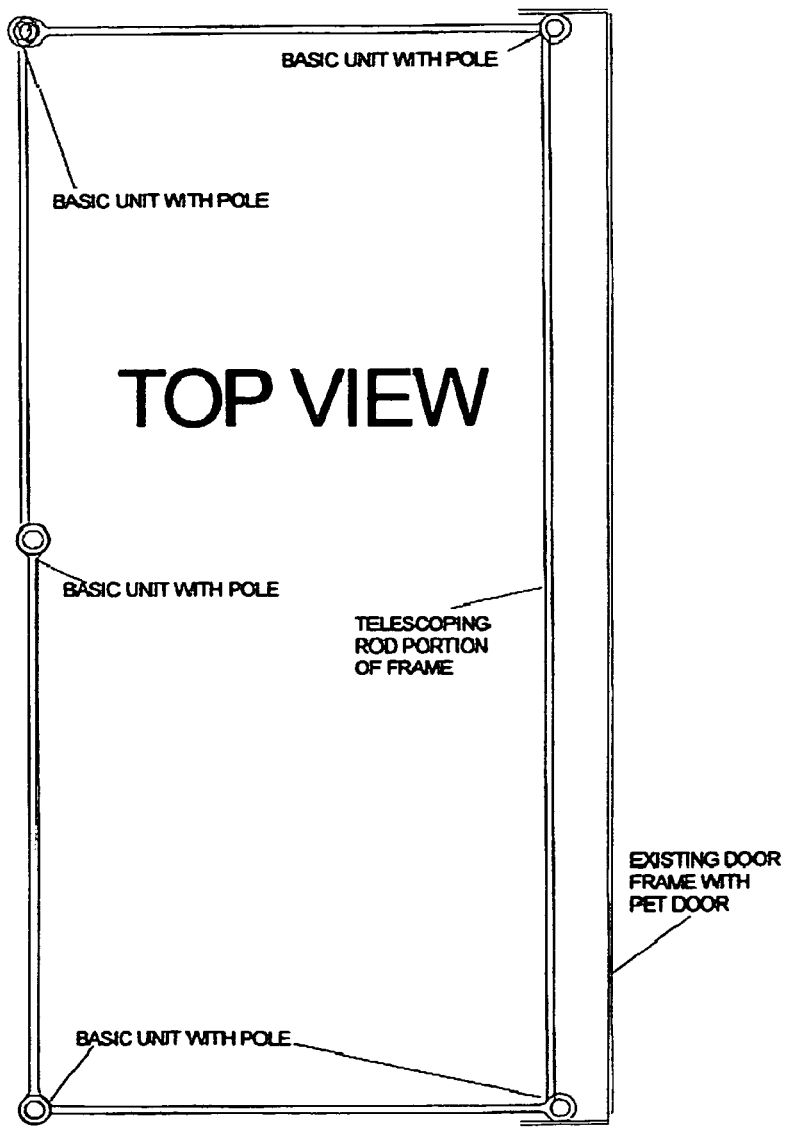
FIG. 2 depicts a top plan view of the secure outdoor enclosure of FIG. 1.

FIG. 2 is a top plan view of the secure outdoor enclosure of FIG. 1.

Figure 3A:
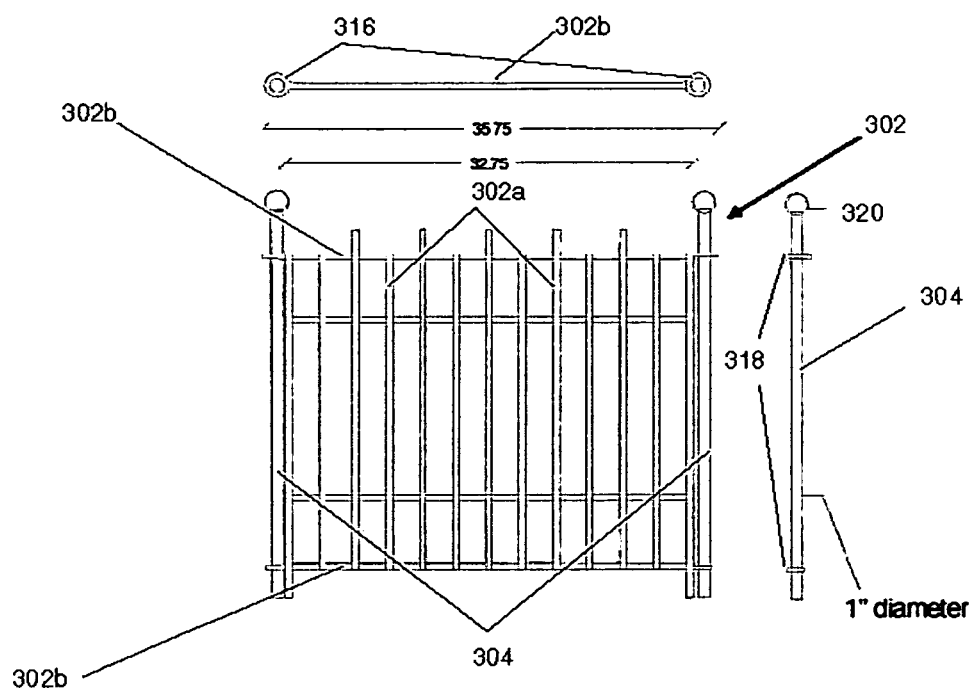
FIG. 3A depicts a partial front view of an example of a panel of the secure outdoor enclosure of FIG. 1.

FIG. 3A is a front partial view of a panel 302 according to an embodiment of the invention. As shown, each panel 302 includes a plurality of vertically-orientated structural members 302a secured together by a plurality of horizontally-orientated rails 302b. Each structural member 302a may be spaced away from one another by a predetermined distance (e.g., about two and one-half (2.5) inches), similar to spacing in a wrought-iron fence or gate. Each panel 302 may be approximately thirty-six (36) inches in width and approximately thirty (30) inches in height; however, one of ordinary skill in the art will appreciate that the width and height may vary according to the application. In one embodiment, the structural members 302a may vary in length. For example, the structural members 302a may alternate between a first length and a second length wherein the first length is less than the second length. In one embodiment, the second length may protrude past the top rail 302b as shown in FIG. 3a.

Figure 3B:
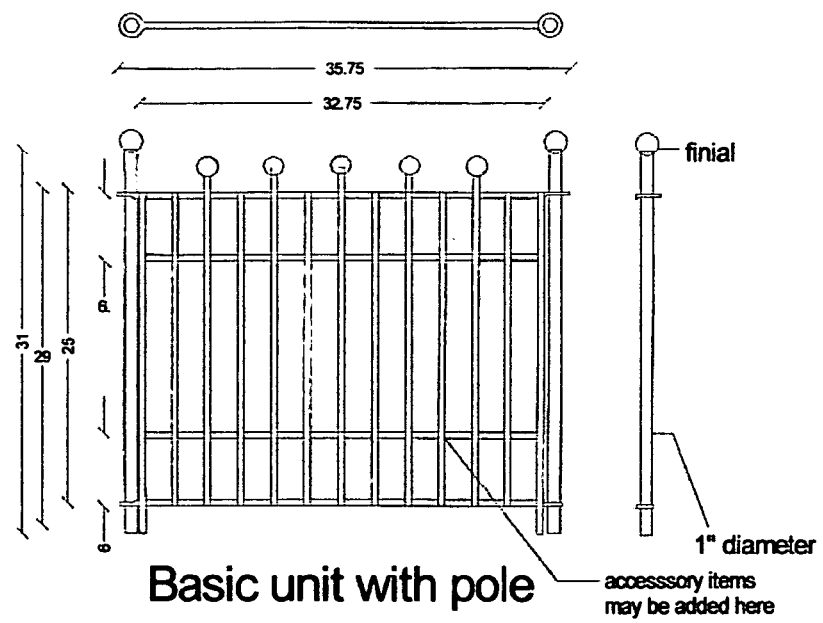
FIG. 3B depicts a partial front view of another example of a panel of the secure outdoor enclosure of FIG. 1.

Continuing to refer to FIG. 3a, line posts 304 are also shown at either end of the panel 302. Generally, a line post 304 is thicker and taller in length relative to the structural members 302. For example, in one embodiment, each line post 304 may be approximately thirty-one (31) inches in height and approximately one (1) inch in diameter; however, one of ordinary skill in the art will appreciate that the height and thickness may vary according to the application. As shown, top and bottom rails 302b may support a panel 302 by providing (i) structural support to the plurality of structural members 302a, e.g. by welding, and (ii) means to engage the line posts 304 at either end thereto. For example, a line post 304 may slideably engage with a ring member 316 located at either end of top and bottom rails 302b. The ring members 316 may rest on two protrusions 318 on the line post 304 to sturdy the panel 302. This allows for quick assembly and disassembly of panels 302 to form the enclosure as illustrated with reference to FIG. 1. Finally, on a top end, each line post 304 may terminate with a finial 320; however, other "capping" devices such as, but not limited to, solar caps, are also within the scope of the invention. On a bottom end, each line post 304 may terminate in a rubber member (not shown) to avoid sliding of the post on a hard surface. FIG. 3b illustrates an alternative embodiment of a panel.

FIG. 4 is a detailed list of the elements of the structure.

For purposes of clarity and brevity, like elements and components will bear the same designations and numbering throughout the Figures.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A secure enclosure for pets for the owner's and pet's security and relaxation, comprising:
    an enclosure, comprising a plurality of panels, wherein the plurality of panels comprise a front panel, and wherein the plurality of panels are assembled together to create a front barrier and side barriers of the secure pet enclosure;
    a plurality of line posts configured to secure the plurality of panels together;
    wherein the front panel defines the front barrier to the secure structure;
    wherein the side barriers are slidably connected to said front panel, and slidingly connected to said plurality of line posts; wherein the front barrier and the side barriers define the secure enclosure therein;
    a doggie door, for when used in conjunction with the side barriers and the front panel, provides a secure enclosure for pets to ingress/egress from a house without the owner having to be present;
    a cover or awning, for covering an area defined by the secure enclosure, slidingly connected said plurality of line posts;
    a plurality of telescoping poles, for holding the cover or awning taut;
    a plurality of vertically-oriented structural members of each panel, which are secured by a plurality of horizontally-orientated rails;
    the plurality of horizontally-oriented rails comprising a top rail and a bottom rail;
    a ring member, configured to be attached to an end of the top rail and an end of the bottom rail to engage with the plurality of line posts to complete the secure enclosure, wherein the ring member is rigidly connected to the plurality of horizontally-oriented rails, and rigidly connected to said plurality of telescoping poles; and
    a plurality of finials, comprising a termination point or "capping" device for each line post, each finial being snugly connected to each line post of the plurality of line posts.

2. A secure enclosure for pets for the owner's and pet's security and relaxation, comprising:
    an enclosure, comprising a plurality of panels, wherein the plurality of panels comprise a front panel, and wherein the plurality of panels are assembled together to create a front barrier and side barriers of the secure pet enclosure;
    a plurality of line posts configured to secure the plurality of panels together;
    wherein the front panel defines the front barrier to the secure structure;
    wherein the side barriers are slidably connected to said front panel, and slidingly connected to said plurality of line posts; wherein the front barrier and the side barriers define the secure enclosure therein when used adjacent to a house having a doggie door;
    a cover or awning, for covering an area defined by the secure enclosure, slidingly connected said plurality of line posts;
    a plurality of telescoping poles, for holding the cover or awning taut;
    a plurality of vertically-oriented structural members of each panel, which are secured by a plurality of horizontally-orientated rails;
    the plurality of horizontally-oriented rails comprising a top rail and a bottom rail;
    a ring member, configured to be attached to an end of the top rail and an end of the bottom rail to engage with the plurality of line posts to complete the secure enclosure, wherein the ring member is rigidly connected to the plurality of horizontally-oriented rails, and rigidly connected to said plurality of telescoping poles; and
    a plurality of finials, comprising a termination point or "capping" device for each line post, each finial being snugly connected to each line post of the plurality of line posts.

* * * * *